US 9,104,612 B2

United States Patent
Hsieh et al.

(10) Patent No.: US 9,104,612 B2
(45) Date of Patent: Aug. 11, 2015

(54) SYSTEM STABILITY PREDICTION USING PROLONGED BURST DETECTION OF TIME SERIES DATA

(71) Applicant: Oracle International Corporation, Redwood Shores, CA (US)

(72) Inventors: Teh-Ming Hsieh, San Jose, CA (US); Liang Dong, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 14/010,893

(22) Filed: Aug. 27, 2013

(65) Prior Publication Data

US 2015/0067405 A1   Mar. 5, 2015

(51) Int. Cl.
*G06F 11/14* (2006.01)

(52) U.S. Cl.
CPC ................................. *G06F 11/1412* (2013.01)

(58) Field of Classification Search
CPC ............ G06F 11/1412; G06F 11/1464; G06F 11/1448; G06F 11/1451; G06F 17/30575; G06F 17/30867; H04L 43/0876; H04L 2012/5628; H04L 2012/5636; H04H 60/31
See application file for complete search history.

(56) References Cited

U.S. PATENT DOCUMENTS

| | | | | |
|---|---|---|---|---|
| 7,437,446 | B2 * | 10/2008 | Bailey et al. | 709/223 |
| 8,112,511 | B2 * | 2/2012 | Sim et al. | 709/223 |
| 8,274,840 | B2 * | 9/2012 | Kim et al. | 365/185.33 |
| 8,341,106 | B1 * | 12/2012 | Scolnicov et al. | 706/47 |
| 2005/0120111 | A1 * | 6/2005 | Bailey et al. | 709/224 |
| 2006/0026467 | A1 * | 2/2006 | Nehab et al. | 714/38 |
| 2008/0263200 | A1 * | 10/2008 | Sim et al. | 709/224 |
| 2010/0228855 | A1 * | 9/2010 | Sim et al. | 709/224 |
| 2011/0208860 | A1 * | 8/2011 | Sim et al. | 709/224 |
| 2013/0344859 | A1 * | 12/2013 | Abramson et al. | 455/418 |

* cited by examiner

*Primary Examiner* — Nadeem Iqbal
(74) *Attorney, Agent, or Firm* — Osha Liang LLP (57) ABSTRACT

Embodiments of the invention relate to a system comprising a processor, a burst detection module executing on the processor, and a resource monitor. The burst detection module is configured to receive a set of resource usages samples measuring an availability of a resource, calculate an absolute moving average (AMA) of the set of resource usage samples, calculate a mean dispersion of the set of resource usage samples, and determine that the set of resource usage samples comprises an aberrant sample by comparing the AMA to the mean dispersion. The resource monitor is configured to execute a recovery procedure in response to the determination that the set of resource usage samples comprise the aberrant sample.

20 Claims, 10 Drawing Sheets

| Time | Value | WC | AMA | WC x AMA | Mean Dispersion | Change to Count | New Count |
|---|---|---|---|---|---|---|---|
| T1 | 11 | N/A | N/A | N/A | N/A | N/A | N/A |
| T2 | 14 | N/A | N/A | N/A | N/A | N/A | N/A |
| T3 | 12 | N/A | N/A | N/A | N/A | N/A | N/A |
| T4 | 17 | N/A | N/A | N/A | N/A | N/A | N/A |
| T5 | 17 | N/A | N/A | N/A | N/A | N/A | N/A |
| T6 | 10 | 0.736 | 2.5 | 1.839 | 2.702 | 0 | 0 |
| T7 | 5 | 0.740 | 3.5 | 2.590 | 4.658 | 0 | 0 |
| T8 | 3 | 0.780 | 4.25 | 3.314 | 6.083 | 0 | 0 |
| T9 | 2 | 0.819 | 4.0 | 3.2278 | 6.189 | 0 | 0 |
| T10 | 4 | 0.877 | 3.75 | 3.288 | 3.114 | +1 | 1 |
| T11 | 8 | 0.860 | 2.5 | 2.150 | 2.302 | -1 | 0 |
| T12 | 3 | 0.834 | 2.25 | 1.876 | 2.345 | 0 | 0 |
| T13 | 5 | 0.853 | 3.0 | 2.558 | 2.302 | +1 | 1 |
| T14 | 3 | 0.834 | 3.25 | 2.710 | 2.074 | +1 | 2 |
| T15 | 8 | 0.824 | 3.25 | 2.679 | 2.510 | +1 | 3 |
| T16 | 4 | 0.787 | 3.5 | 2.754 | 2.074 | +1 | 4 |
| T17 | 7 | 0.824 | 3.25 | 2.679 | 2.074 | +1 | 5 |

SYSTEM STABILITY PREDICTION USING PROLONGED BURST DETECTION OF TIME SERIES DATA

BACKGROUND

Most computer systems include a memory management module designed to provide sufficient memory resources when requested by processes executing on the system. In many computer systems, the time series data describing memory usage appears random yet still maintains a reasonably stable pattern. However, once memory resources become scarce, the memory management module on the computer system may attempt to reclaim memory from non-essential functions and/or perform tradeoff operations that lower system performance. Often, these actions are temporary and the system eventually returns to a normal memory usage pattern. However, prolonged behavior of this kind may indicate the existence of memory leaks and/or memory fragmentation. Specifically, the memory scarcity may go beyond the capability of memory management module. If this situation persists, a system failure may be imminent.

SUMMARY

In general, in one aspect, embodiments of the invention relate to a system comprising a processor, a burst detection module executing on the processor, and a resource monitor. The burst detection module is configured to receive a set of resource usages samples measuring an availability of a resource, calculate an absolute moving average (AMA) of the set of resource usage samples, calculate a mean dispersion of the set of resource usage samples, and determine that the set of resource usage samples comprises an aberrant sample by comparing the AMA to the mean dispersion. The resource monitor is configured to execute a recovery procedure in response to the determination that the set of resource usage samples comprise the aberrant sample.

In general, in one aspect, embodiments of the invention relate to a method for monitoring resources on a computing system. The method includes receiving a set of resource usage samples measuring an availability of a resource on the computing system, calculating, using a processor on the computing system, an absolute moving average (AMA) of the set of resource usage samples, and calculating, using the processor, a mean dispersion of the set of resource usage samples. The method further includes determining, using the processor, that the set of resource usage samples comprises an aberrant sample by comparing the AMA to the mean dispersion, and executing, using the processor, a recovery procedure in response to the determination that the set of resource usage samples comprise the aberrant sample.

In general, in one aspect, embodiments of the invention relate to a non-transitory computer readable medium comprising instructions that, when executed by a processor, perform a method for monitoring resources on a computing system. The method includes receiving a set of resource usage samples measuring an availability of a resource on the computing system, calculating, using a processor on the computing system, an absolute moving average (AMA) of the set of resource usage samples, and calculating, using the processor, a mean dispersion of the set of resource usage samples. The method further includes determining, using the processor, that the set of resource usage samples comprises an aberrant sample by comparing the AMA to the mean dispersion, and executing, using the processor, a recovery procedure in response to the determination that the set of resource usage samples comprise the aberrant sample.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for detecting bursts for a monitored resource. Specifically, embodiments of the invention use statistic models in time domain to detect the prolonged time series data of aberrant memory usage patterns caused by high frequency of memory management activities and issue warning for imminent system failure and provide ample time for graceful system self-recovery actions and/or administrator corrective actions to prevent total system failure from occurring. Since this algorithm is in time domain, computation and resources footprint can be minimized and make it easy to detect any aberrant behavior by tracking time-series memory usage data.

Figure 1:
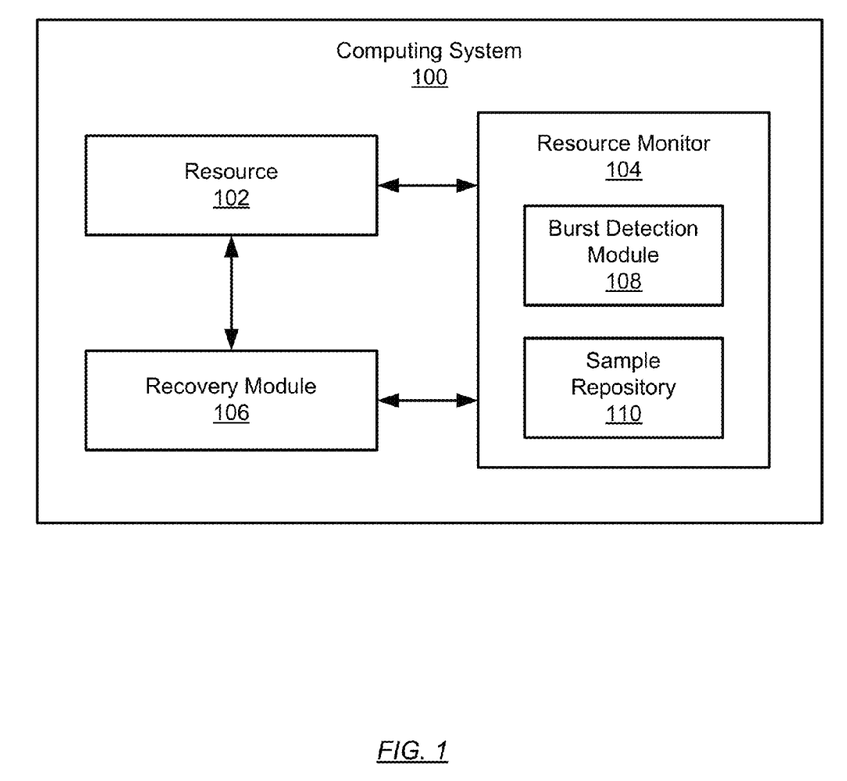
FIG. 1 shows a system in accordance with one or more embodiments of the invention.

FIG. 1 shows a diagram of a system in accordance with one or more embodiments of the invention. As shown in FIG. 1, the computing system (100) includes a resource (102), a resource monitor (104), and a recovery module (106). The resource monitor (104) includes a burst detection module (108) and a sample repository (110).

In one or more embodiments of the invention, the computing system (100) is a computer system or group of computer systems configured to host applications to accomplish tasks. In one or more embodiments of the invention, the computing system (100) further includes functionality to provide data and/or application processing to connected clients (not shown). In one or more embodiments of the invention, the computing system (100) may be implemented as a database server hosting a database.

In one or more embodiments of the invention, the resource (102) is a physical or virtual component of the computing system (100) that is of limited availability. Examples of resources (e.g., resource (102)) include, but are not limited to, free memory (random access memory and virtual memory), central processing unit (CPU), persistent storage space, network availability, electrical power availability, external device availability, and input/output operation availability.

In one or more embodiments of the invention, exhaustion of the resource (102) negatively impacts the computing system (100). Such negative impacts may include reduced responsiveness and the inability to effectively execute system tasks. For some types of resources (e.g., memory, CPU, etc.), complete resource exhaustion may cause a system-wide failure.

In one or more embodiments of the invention, the resource monitor (104) is a process or group of processes executing on the computing system (100) with functionality to monitor one or more resources (e.g., resource (102)). In one or more embodiments of the invention, resources (e.g., resource (102)) are measured by obtaining a set of resource usage samples describing the state of the resource. In one or more embodiments of the invention, resource usage samples are received at regular time intervals and represent the state of the resource measured at those intervals. In one or more embodiments of the invention, resource usages samples are measurements of unused (i.e., free) memory on the computing system (100) at the point in time the sample is sent or obtained. In one or more embodiments of the invention, the resource monitor (104) obtains resource usage samples from the resource (102) directly or via a resource manager (not shown). Other examples of resource usage samples include measurements of the percent of archive area used, average file read/write time, broken job count, percent of lock limit usage, service CPU time per user call, service response time per user call, deferred transaction count, dump area used, percent of buffer cache hit, CPU usage per second, CPU usage per transaction, percent of cursor cache hit, data dictionary hit, percent of database CPU time, global cache average convert time, percent of standard query language (SQL) response time, percent of Java™ pool free, percent of hypertext transfer protocol (HTTP) 200 s responses, requested handling time for a module, requested handling throughput for a module, active http connections, response data throughput, database management system job processing time, database management system job uptime, job dispatcher job step average backlog, job dispatcher processing time, rows per hour of the loader throughput, notification processing time, number of roles, percent of CPU consumption, number files open, number threads created, percent of resident memory utilization, virtual memory utilization, and virtual memory utilization growth. Further detail regarding the resource monitor (104) is provided below in FIG. 2.

In one or more embodiments of the invention, resource usage samples are received by the resource monitor (104) and stored in the sample repository (110). In one or more embodiments of the invention, the sample repository (110) is a combination of software and hardware with functionality to store resource usage samples. In one or more embodiments of the invention, the sample repository (110) further includes functionality to provide a set of resource usage samples to the burst detection module (108).

In one or more embodiments of the invention, the burst detection module (108) is a process or group of processes with functionality to detect that a resource burst has occurred. In one or more embodiments of the invention, a resource burst is a predictor of the exhaustion of a resource. In other words, a resource burst precedes the exhaustion of a resource. Further detail regarding the burst detection module (108) is provided below in FIG. 3.

In one or more embodiments of the invention, the recovery module (106) is a process or group of processes executing on the computing system (100) with functionality to increase the availability of the resource (102). In one or more embodiments of the invention, the recovery module (106) is configured to increase the availability of the resource (102) by executing a recovery procedure. In one or more embodiments of the invention, the recovery procedure instructs the recovery module (106) to generate an alert indicating that a resource burst has been detected and send the alert to a system administrator.

In one or more embodiments of the invention, the recovery procedure includes self-recovery procedures by which the recovery module (106) itself takes steps to increase the availability of the resource (102). In one or more embodiments of the invention, self-recovery procedures include instructing the recovery module (106) to halt one or more processes responsible for the reduced availability of the resource (102). For example, for a free memory resource, the recovery procedure may instruct the recovery module (106) to halt a process responsible for a memory leak.

In one or more embodiments of the invention, the computing system (100) is a subsystem with specialized hardware and software within a server system (not shown) with functionality to report information about elements (i.e., a measurable hardware or software component) of the server system to an external facility. For example, the computing system (100) may be implemented as a service processor within an enterprise database server system that relays information about the state of the database elements to an external facility. The dedicated resources (such as memory) used by the service processor may be monitored by an implementation of the resource monitor (104).

Figure 2:
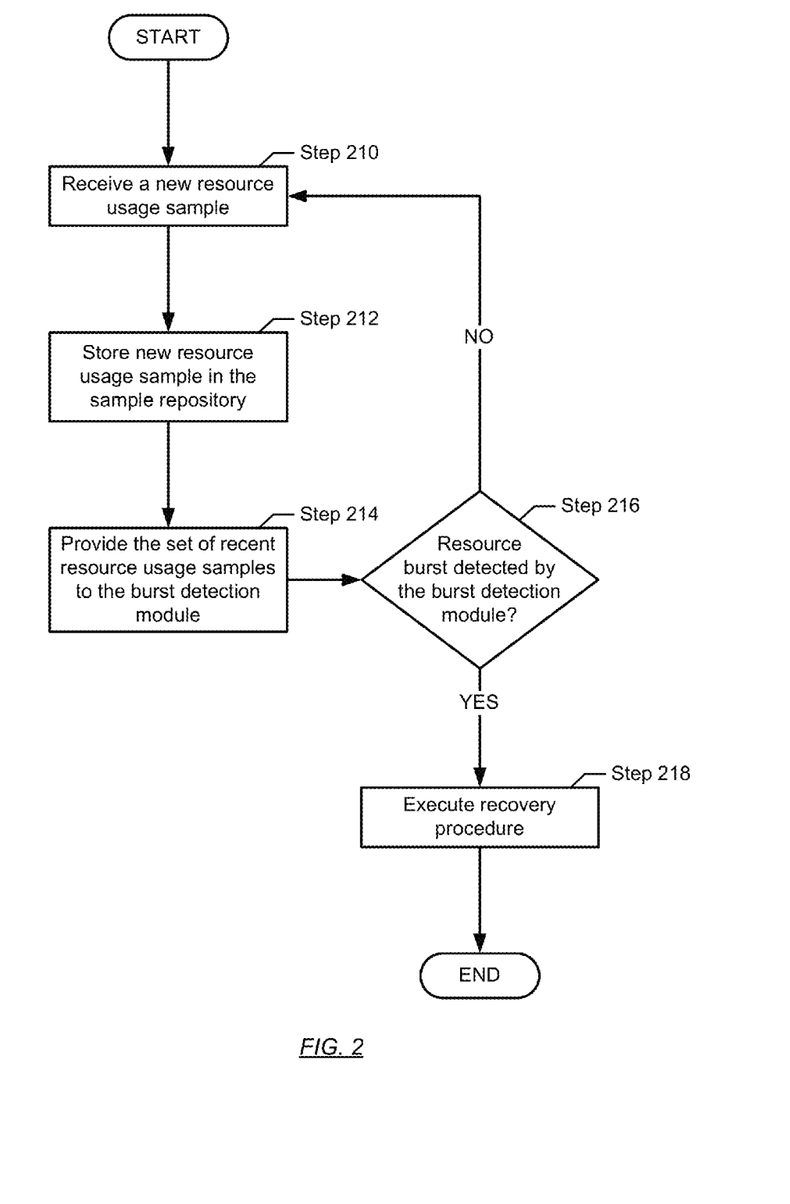
FIG. 2 shows a flow diagram in accordance with one or more embodiments of the invention.

FIG. 2 shows a flowchart for monitoring resource usage samples in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 210, the resource monitor receives a new resource usage sample. In Step 212, the resource monitor stores the new resource usage sample in the sample repository. In Step 214, the resource monitor provides a set of recent resource usage samples to the burst detection module. In Step 216, the resource monitor uses the burst detection module to determine whether a resource burst has been detected based on the set of recent resource usage samples. Further details about Step 216 is provided in FIG. 3.

If in Step 216, the resource monitor is notified that a resource burst has not been detected, then the process returns to Step 210 to wait to receive another resource usage sample. If in Step 216, the resource monitor is notified that a resource burst has been detected, then in Step 218, the resource monitor instructs the recovery module to execute a recovery procedure. In one or more embodiments of the invention, the recovery procedure is executed to directly or indirectly increase the availability of the resource. The recovery procedure may directly increase the availability of the resource by halting or terminating processes and/or applications responsible for the resource burst. The recovery procedure may indirectly increase the availability of the resource by altering another process or system administrator of the resource burst, who will subsequently take actions to increase the availability of the resource.

Figure 3:
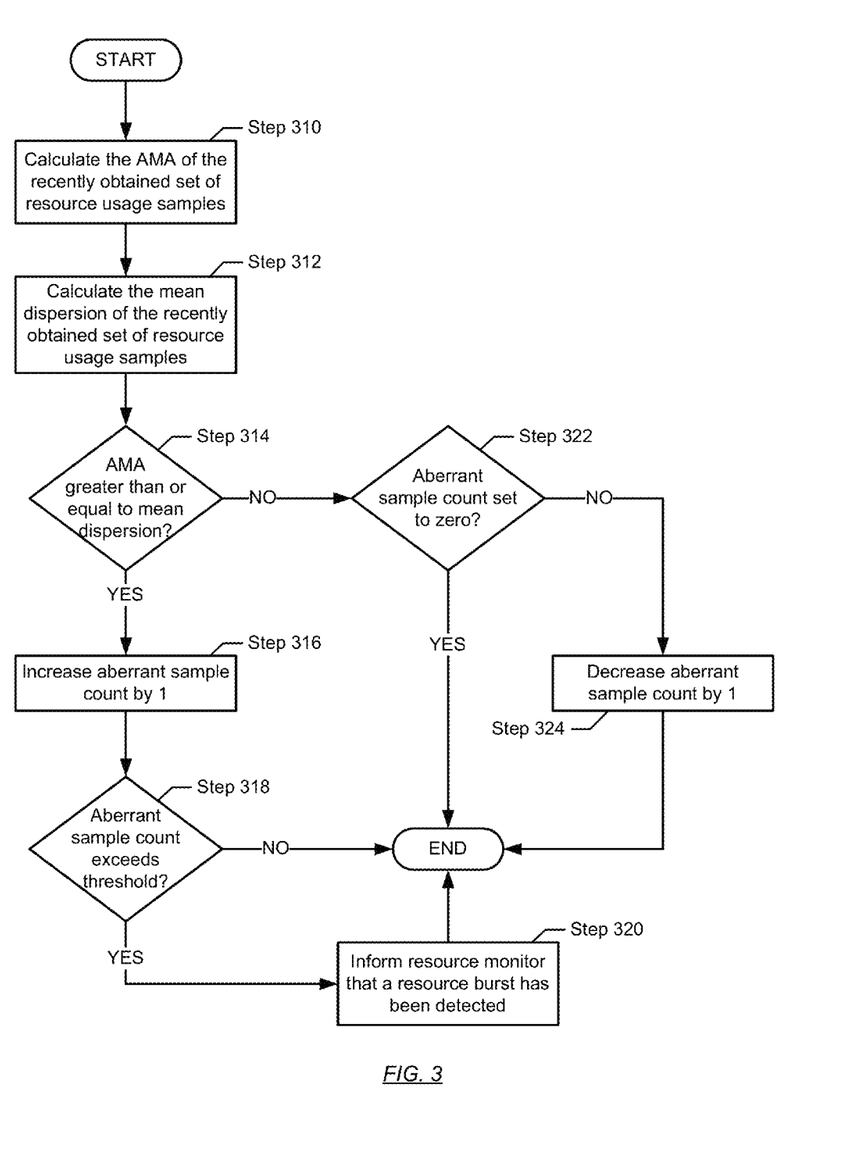
FIG. 3 shows a flow diagram in accordance with one or more embodiments of the invention.

FIG. 3 shows a flowchart for detecting a resource burst in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 310, the burst detection module calculates the absolute moving average (AMA) of the recently obtained set of resource usage samples. In one or more embodiments of the invention, the AMA is the absolute mean difference between consecutive resource usage samples in a set of resource usage samples. In one or more embodiments of the invention, the set of resource usage samples used to calculate the AMA is referred to as the AMA range and is denoted K. In one or more embodiments of the invention, the AMA range excludes the most recently obtained resource usage sample.

In one or more embodiments of the invention, the AMA is weighted using a weighting algorithm. In one or more embodiments of the invention, the weighting algorithm generates a weighting component (WC) that changes the AMA value depending upon the stability of the system. In one or more embodiments of the invention, the WC is calculated using the following formula:

$$WC = \alpha - \beta(MA/FMH)$$

where $\alpha$ and $\beta$ are constants selected depending upon the system configuration, MA (moving average) is the mean of the availability of the resource over the AMA range, and FMH (free memory high) is the maximum availability of the resource over the AMA range. In one or more embodiments of the invention, the WC will be closer to $\alpha$ on a system where the availability of the resource is subject to large fluctuations (i.e., a larger difference between the mean resource availability (MA) and the maximum availability of the resource (FMH), and therefore MA/FMH is closer to 0), and the WC will be lower than $\alpha$ (up to a maximum equal to $\beta$) on a system where the availability of the resource is consistent (i.e., a smaller difference between the MA and FMH, and therefore MA/FMH is closer to 1).

In Step 312, the burst detection module calculates the mean dispersion of the recently obtained set of resource usage samples. In one or more embodiments of the invention, the mean dispersion is calculated as the standard deviation (SD) of a set of resource usage samples. In one or more embodiments of the invention, the set of resource usage samples used to calculate the mean dispersion is referred to as the dispersion range and is denoted M.

In Step 314, the burst detection module determines whether the most recent sample is an aberrant sample by comparing the AMA to the mean dispersion. In one or more embodiments of the invention, the comparison includes determining whether the weighted AMA is greater than or equal to the mean dispersion. In one or more embodiments of the invention, an aberrant sample is a single indication of a trend toward a resource burst. In one or more embodiments of the invention, a resource burst is determined to have occurred when a number of aberrant samples have been detected.

If in Step 314, the burst detection module determines that the AMA is greater than or equal to the mean dispersion, then in Step 316, the burst detection module increases the aberrant sample count by one. In Step 318, the burst detection module determines whether the aberrant sample count exceeds a threshold. In one or more embodiments of the invention, the threshold is the maximum number of tolerable consecutive aberrant samples before the aberrant samples indicate a resource burst. A burst detection module with a higher threshold may be less sensitive to resource bursts, and a burst detection module with a lower threshold may be more sensitive to resource bursts. If in Step 318, the burst detection module determines that the aberrant sample count exceeds the threshold, then in Step 320, the burst detection module informs the resource monitor that a resource burst has been detected.

If in Step 314, the burst detection module determines that the AMA is not greater than or equal to the mean dispersion, then in Step 322, the burst detection module determines whether the aberrant sample count is currently set to zero. If in Step 322, the burst detection module determines that the aberrant sample count is currently set to zero, then the process ends. If in Step 322, the burst detection module determines that the aberrant sample count is not currently set to zero, then in Step 324, the burst detection module decreases the aberrant sample count by one.

Figure 4A:
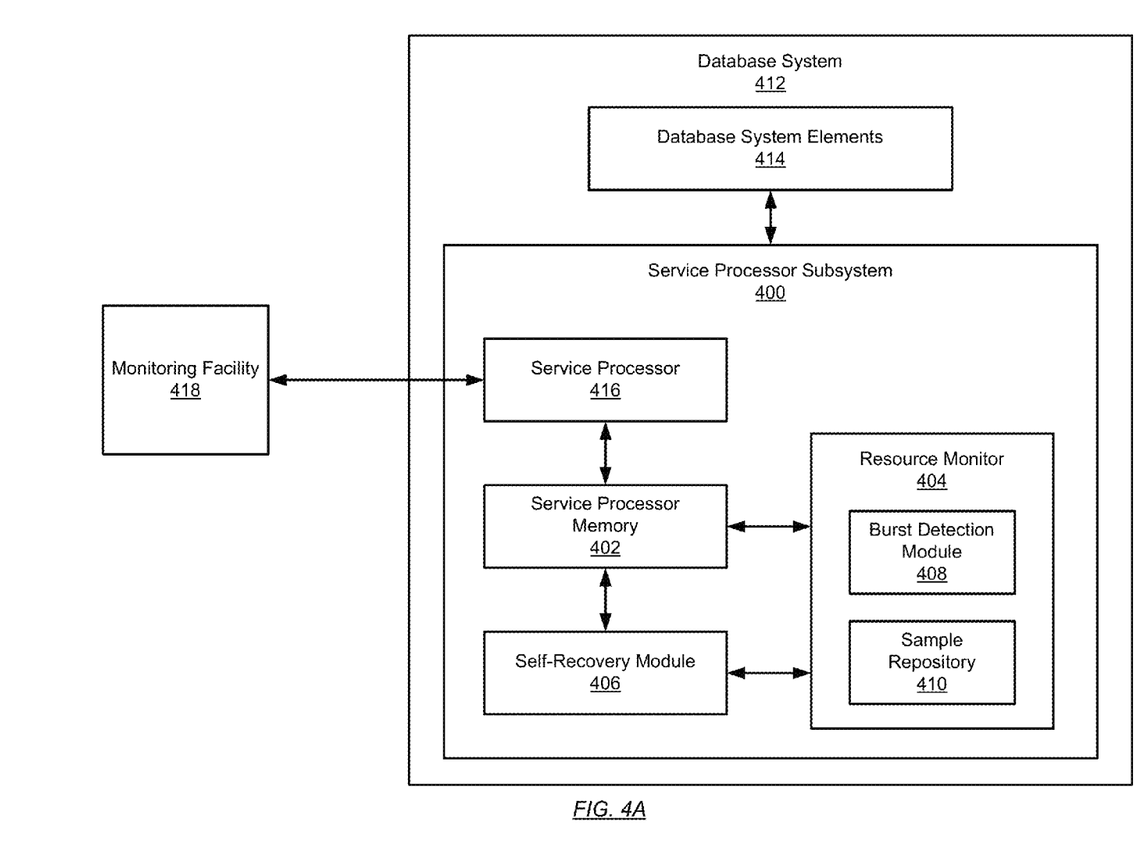
FIGS. 4A-4C show an example in accordance with one or more embodiments of the invention.
Figure 4B:
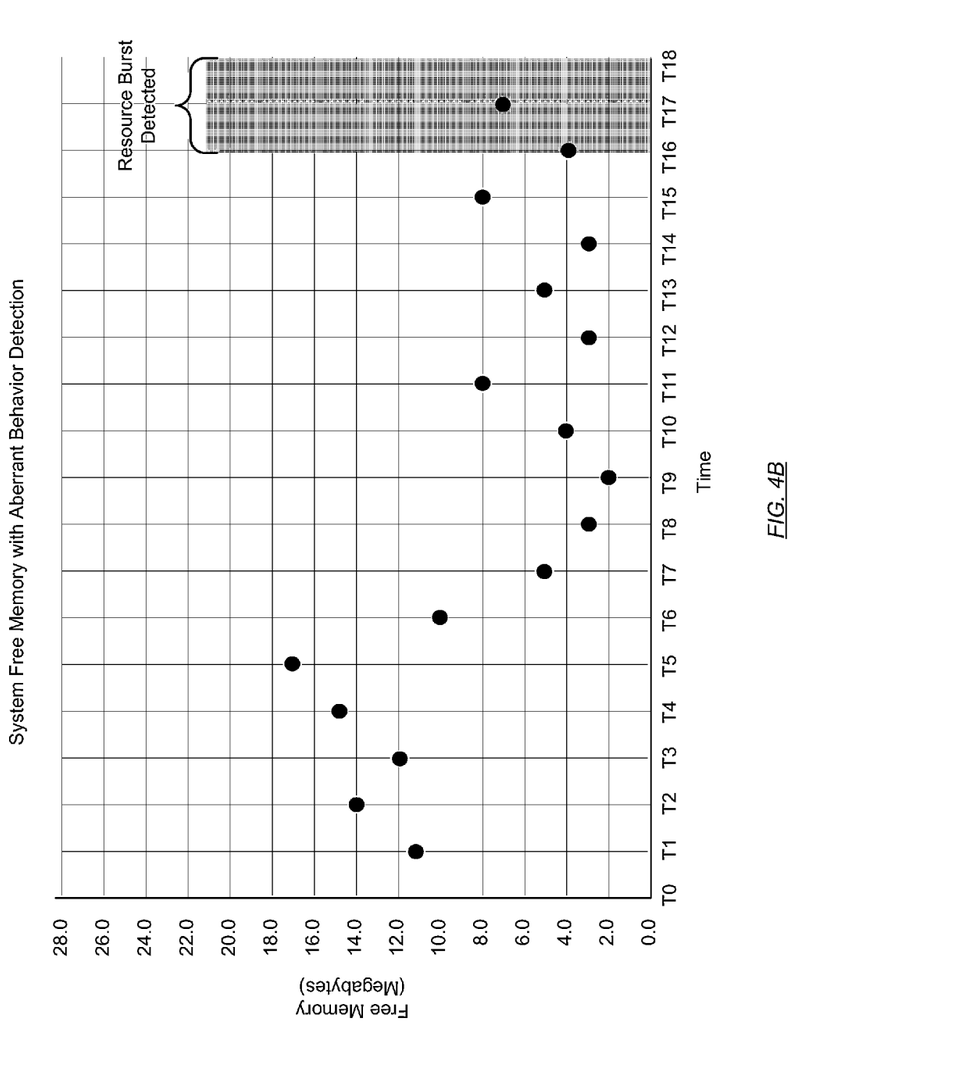
Figure 4C:
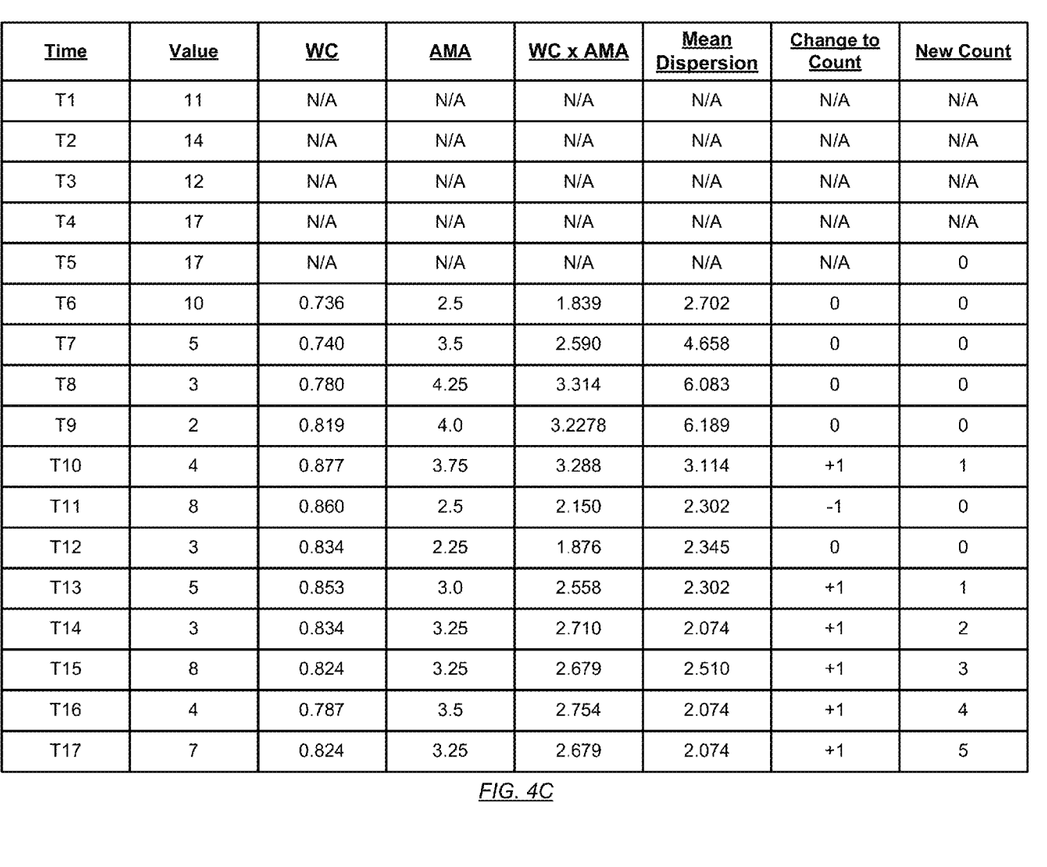

FIGS. 4A-4C show an example in accordance with one or more embodiments of the invention. Specifically, FIG. 4A shows an example computing system in accordance with one or more embodiments of the invention. As shown in FIG. 4A, the example system includes a database system (412) that includes database system elements (414) monitored by a service processor subsystem (400). The service processor subsystem (400) includes a service processor (416), service processor memory (402), a resource monitor (404), and a self-recovery module (406). The resource monitor (404) includes a burst detection module (408) and a sample repository (410). The service processor (416) reports information about the database system resources (414) to a monitoring facility (418).

For the purposes of the example, assume that the database system elements are measurable hardware or software components of the database system (412). Such measurable components may include a database CPU(s), database memory, database storage, database operating system kernel, etc. Further, assume that the service processor subsystem (400) is configured to report information about the state of the database system elements (414) to the monitoring facility (418). The service processor (416) uses the service processor memory (402) to perform the reporting function.

FIG. 4B shows a graph of resource usage samples received by the resource monitor (404) from the service processor memory (416) measuring the amount of free memory in the service processor memory (416). FIG. 4C shows a graph of the values calculated as each resource usage sample is received.

For the purposes of the example, assume that burst detection module (408) calculates the WC as WC=1.04−0.375 (MA/FMH), the AMA range is the previous five resource usage samples excluding the most recently received resource usage sample, the mean dispersion is calculated using the SD, and the dispersion range is the five most recently received resource usage samples including the most recently received resource usage sample. Assume also that the threshold is set to 3. Finally, assume that the aberrant sample count after time T5 is zero.

As shown in FIG. 4B, at time T1, the resource monitor (404) receives a resource usage sample indicating that the amount of free memory in the service processor memory (416) is 11 megabytes. At time T2, the amount of free memory is 14 megabytes. At time T2, the amount of free memory is 14 megabytes. At time T3, the amount of free memory is 12 megabytes. At time T4, the amount of free memory is 15 megabytes. At time T5, the amount of free memory is 17 megabytes. Assume that the aberrant sample count after time T5 is zero.

At time T6, the resource monitor (404) receives a resource usage sample indicating that the amount of free memory in the service processor memory (416) is 10 megabytes. As shown in FIG. 4C, after the resource usage sample for time T6 is received, the WC is calculated as 0.740 (MA=13.8, FMH=17, WC=1.04−0.375(13.8/17)=0.736), the AMA is calculated as 2.5 (AMA=(|14−11|+|12−14|+|15−12|+|17−15|)/5=2.5), the mean dispersion is calculated as 2.702 (Standard Deviation of [14, 12, 15, 17, 10]), and the count remains unchanged. The count does not exceed the threshold, and no action is taken.

After the resource usage sample of 5 megabytes for time T7 is received, the WC is calculated as 0.740, the AMA is calculated as 3.5, the mean dispersion is calculated as 4.658, and the count remains unchanged. The count does not exceed the threshold, and no action is taken.

After the resource usage sample of 3 megabytes for time T8 is received, the WC is calculated as 0.780, the AMA is calculated as 4.25, the mean dispersion is calculated as 6.083, and the count remains unchanged. The count does not exceed the threshold, and no action is taken.

After the resource usage sample of 2 megabytes for time T9 is received, the WC is calculated as 0.819, the AMA is calculated as 4.0, the mean dispersion is calculated as 6.189, and the count remains unchanged. The count does not exceed the threshold, and no action is taken.

After the resource usage sample of 4 megabytes for time T10 is received, the WC is calculated as 0.860, the AMA is calculated as 3.75, the mean dispersion is calculated as 3.114, and the count increases by 1. The count does not exceed the threshold, and no action is taken.

After the resource usage sample of 8 megabytes for time T11 is received, the WC is calculated as 0.860, the AMA is calculated as 2.5, the mean dispersion is calculated as 2.302, and the count decreases by 1. The count does not exceed the threshold, and no action is taken.

After the resource usage sample of 3 megabytes for time T12 is received, the WC is calculated as 0.834, the AMA is calculated as 2.25, the mean dispersion is calculated as 2.345, and the count remains unchanged. The count does not exceed the threshold, and no action is taken.

After the resource usage sample of 5 megabytes for time T13 is received, the WC is calculated as 0.853, the AMA is calculated as 3.0, the mean dispersion is calculated as 2.302, and the count increases by 1. The count does not exceed the threshold, and no action is taken.

After the resource usage sample of 3 megabytes for time T14 is received, the WC is calculated as 0.834, the AMA is calculated as 3.25, the mean dispersion is calculated as 2.074, and the count increases by 1. The count does not exceed the threshold, and no action is taken.

After the resource usage sample of 8 megabytes for time T15 is received, the WC is calculated as 0.824, the AMA is calculated as 3.25, the mean dispersion is calculated as 2.510, and the count increases by 1. The count does not exceed the threshold, and no action is taken.

After the resource usage sample of 4 megabytes for time T16 is received, the WC is calculated as 0.787, the AMA is calculated as 3.5, the mean dispersion is calculated as 2.074, and the count increases by 1. The count is now at 4, and exceeds the threshold. A resource burst has been detected, and the self-recovery module (406) is deployed to halt the process causing the memory leak.

After the resource usage sample of 7 megabytes for time T17 is received, the WC is calculated as 0.824, the AMA is calculated as 3.25, the mean dispersion is calculated as 2.074, and the count increases by 1.

Figure 5A:
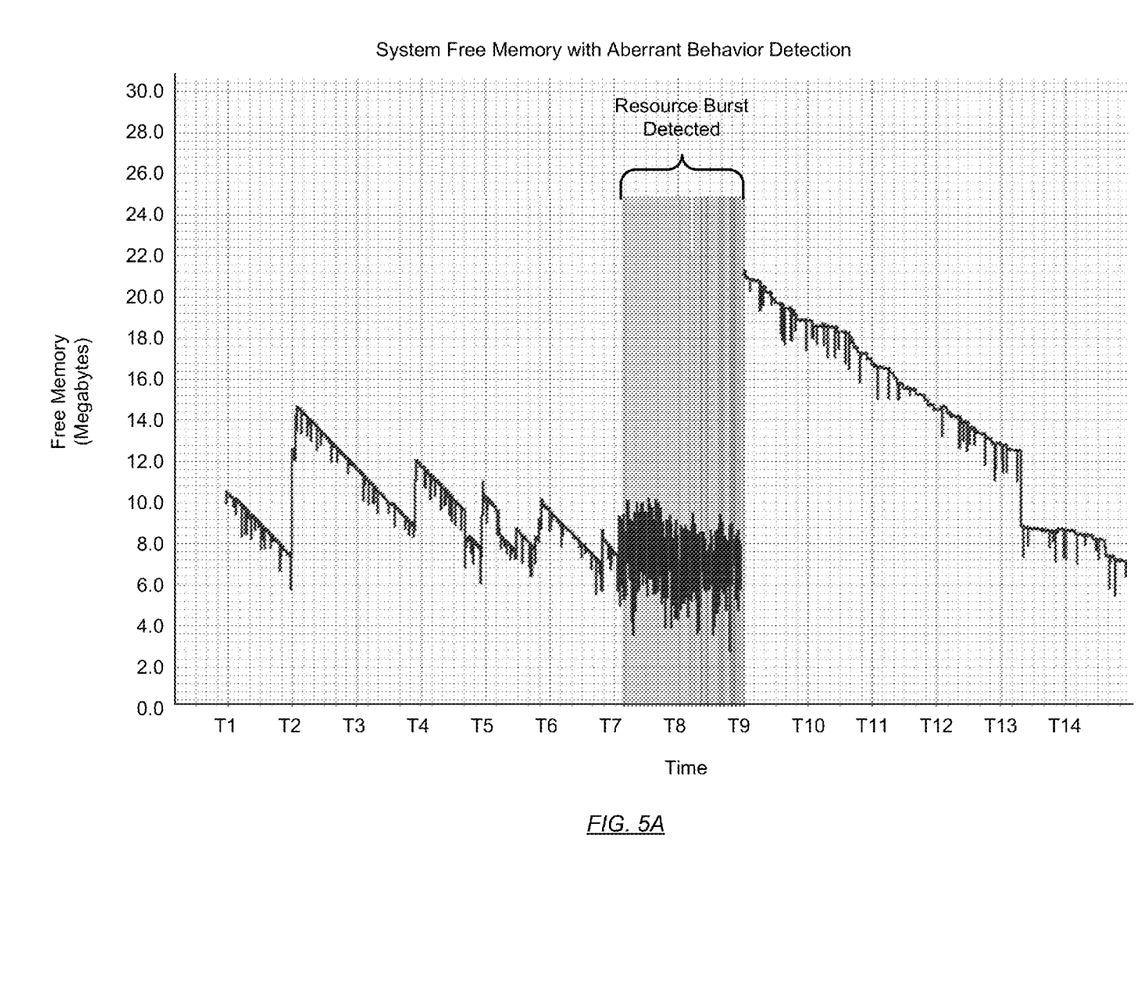
FIGS. 5A-5C show examples in accordance with one or more embodiments of the invention.
Figure 5B:
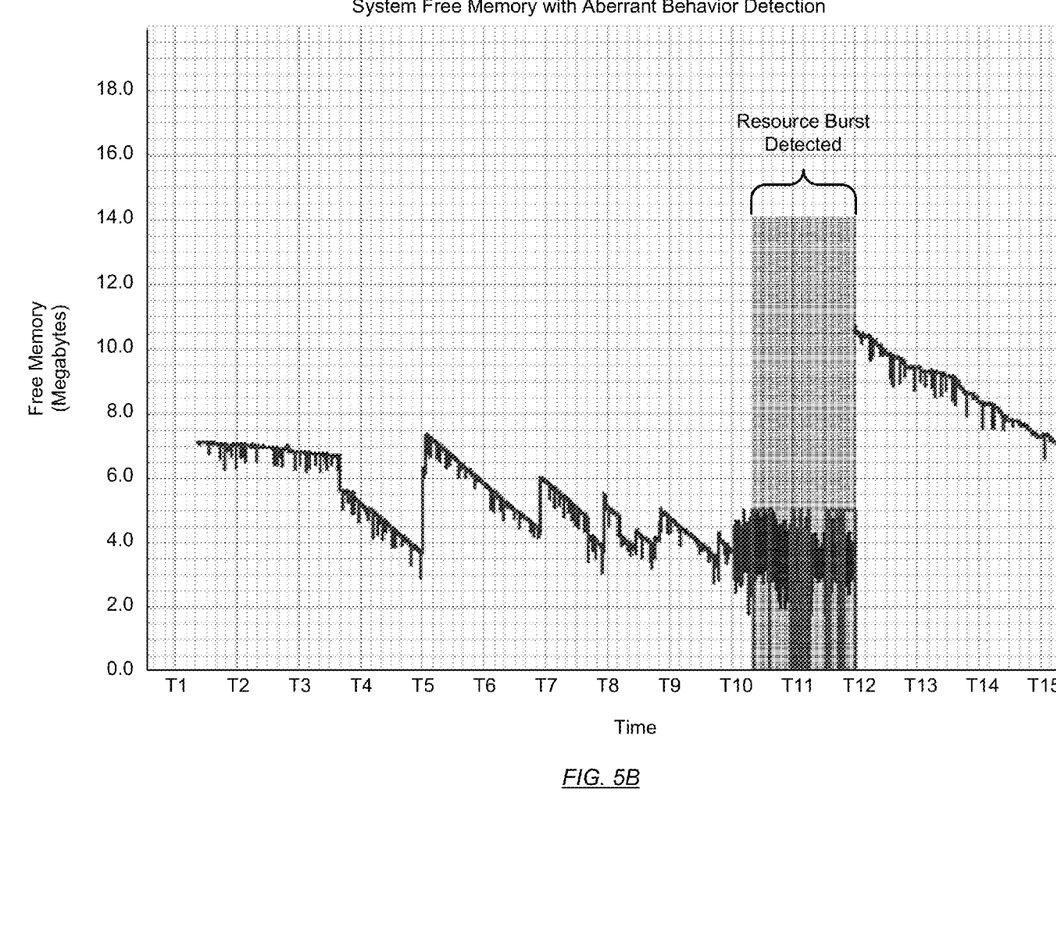
Figure 5C:
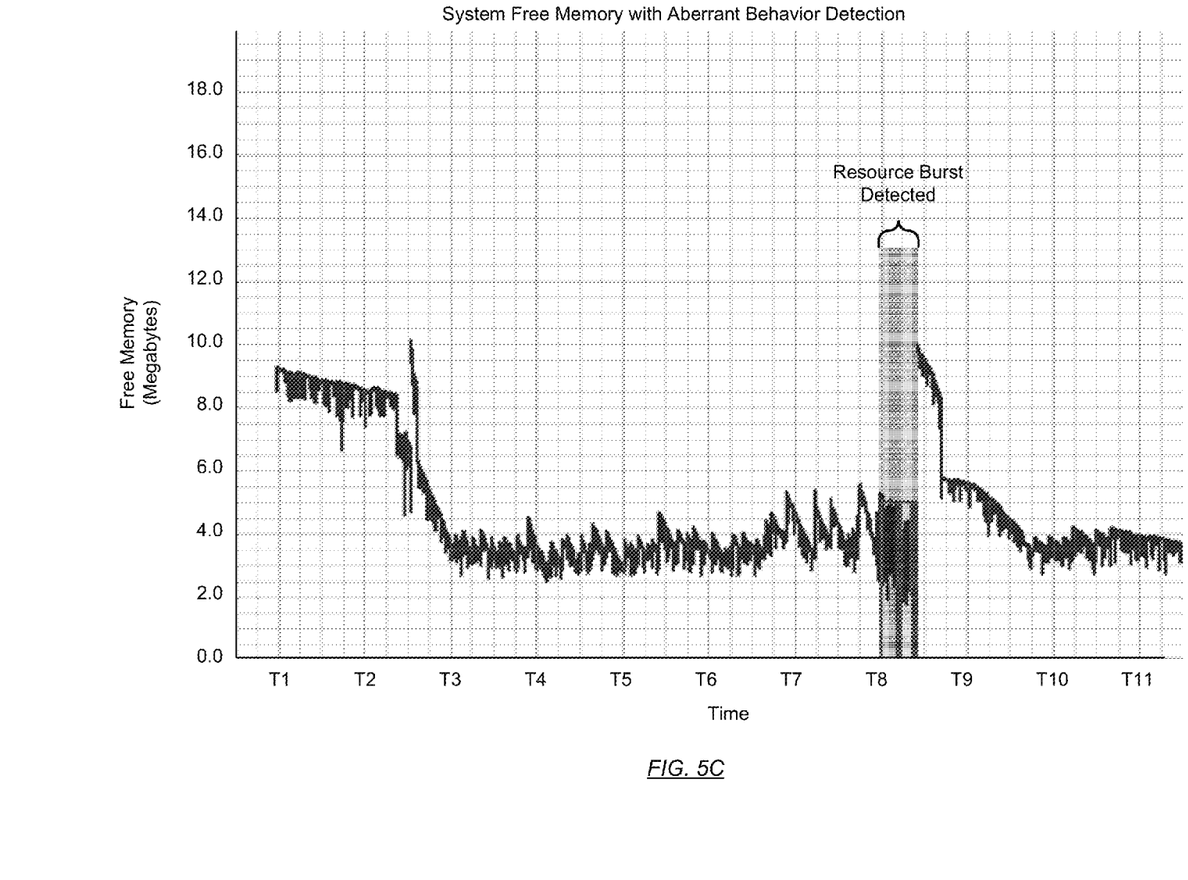

FIGS. 5A-5C show different examples of graphs of resource usage sample (measuring the amount of free memory) received by the resource monitor (404) and the time interval at which a resource burst is detected. As shown in FIG. 5A, the resource monitor (404) receives the resource usage sample at time T7 and determines that the current aberrant sample count has exceeded the threshold, and a resource burst is detected. By time T9, the count has been reduced and no longer exceeds the threshold.

In FIG. 5B, the resource monitor (404) receives the resource usage sample at time T10 and determines that the current aberrant sample count has exceeded the threshold, and a resource burst is detected. By time T12, the count has been reduced and no longer exceeds the threshold.

In FIG. 5C, the resource monitor (404) receives the resource usage sample at time T8 and determines that the current aberrant sample count has exceeded the threshold, and a resource burst is detected. By time T9, the count has been reduced and no longer exceeds the threshold.

Figure 6:
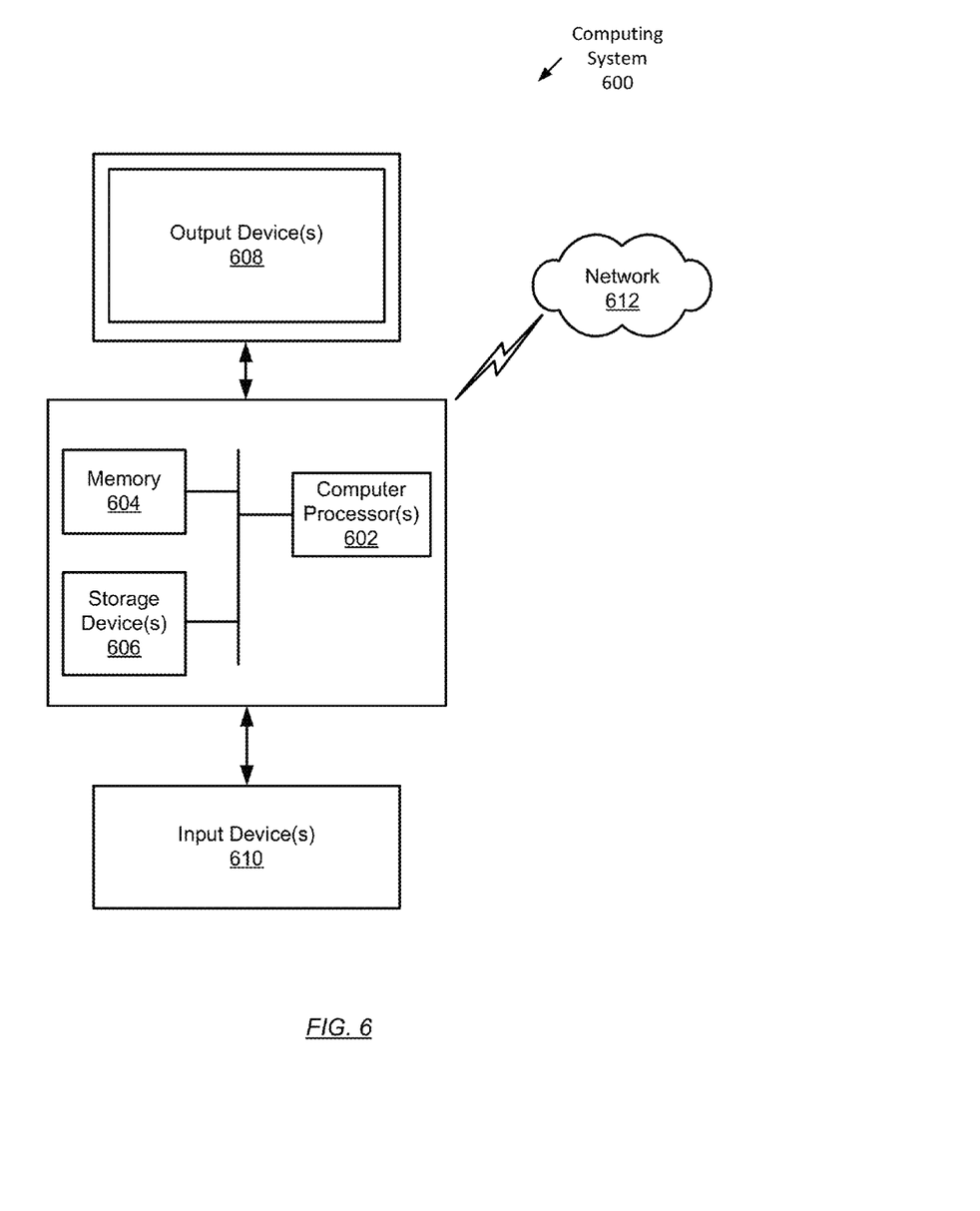
FIG. 6 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor (s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a processor;
   a burst detection module executing on the processor configured to:
      receive a set of resource usages samples measuring an availability of a resource;
      calculate an absolute moving average (AMA) of the set of resource usage samples;
      calculate a mean dispersion of the set of resource usage samples; and
      determine that the set of resource usage samples comprises an aberrant sample by comparing the AMA to the mean dispersion; and
   a resource monitor configured to:
      execute a recovery procedure in response to the determination that the set of resource usage samples comprise the aberrant sample.

2. The system of claim 1,
   wherein executing the recovery procedure comprises informing a recovery module that a resource burst has been detected, and
   wherein the system further comprises:
      the recovery module configured to increase the availability of the resource.

3. The system of claim 1, further comprising:
   a service processor configured to monitor elements of a server system using the resource.

4. The system of claim 1, wherein calculating the mean dispersion of the set of resource usage samples comprises calculating a standard deviation of the set of resource usage samples.

5. The system of claim 1, wherein comparing the AMA to the mean dispersion comprises determining that the AMA is greater than the mean dispersion.

6. The system of claim 1, wherein calculating the AMA of the set of resource usage samples comprises applying a weighting algorithm to the AMA.

7. The system of claim 1, wherein the resource is an amount free memory on the computing system measured at regular time intervals.

8. A method for monitoring resources on a computing system comprising:
   receiving a set of resource usage samples measuring an availability of a resource on the computing system;
   calculating, using a processor on the computing system, an absolute moving average (AMA) of the set of resource usage samples;
   calculating, using the processor, a mean dispersion of the set of resource usage samples;
   determining, using the processor, that the set of resource usage samples comprises an aberrant sample by comparing the AMA to the mean dispersion; and
   executing, using the processor, a recovery procedure in response to the determination that the set of resource usage samples comprise the aberrant sample.

9. The method of claim 8, wherein the resource is an amount free memory on the computing system measured at regular time intervals.

10. The method of claim 8, wherein calculating the mean dispersion of the set of resource usage samples comprises calculating a standard deviation of the set of resource usage samples.

11. The method of claim 8, wherein comparing the AMA to the mean dispersion comprises determining that the AMA is greater than the mean dispersion.

12. The method of claim 8, wherein calculating the AMA of the set of resource usage samples comprises applying a weighting algorithm to the AMA.

13. The method of claim 8,
   wherein the computing system is a subsystem of a server system, and
   wherein the computing system is configured to use the resource to monitor elements of the server system.

14. The method of claim 8, wherein executing the recovery procedure comprises halting a process responsible for a reduction in the availability of the resource.

15. A non-transitory computer readable medium comprising instructions that, when executed by a processor, perform a method for monitoring resources on a computing system comprising:
   receiving a set of resource usage samples measuring an availability of a resource on the computing system;
   calculating, using the processor, an absolute moving average (AMA) of the set of resource usage samples;
   calculating, using the processor, a mean dispersion of the set of resource usage samples;
   determining, using the processor, that the set of resource usage samples comprises an aberrant sample by comparing the AMA to the mean dispersion; and
   executing, using the processor, a recovery procedure in response to the determination that the set of resource usage samples comprise the aberrant sample.

16. The non-transitory computer readable medium of claim 15, wherein the resource is an amount free memory on the computing system measured at regular time intervals.

17. The non-transitory computer readable medium of claim 15, wherein calculating the mean dispersion of the set of resource usage samples comprises calculating a standard deviation of the set of resource usage samples.

18. The non-transitory computer readable medium of claim 15, wherein comparing the AMA to the mean dispersion comprises determining that the AMA is greater than the mean dispersion.

19. The non-transitory computer readable medium of claim 15, wherein calculating the AMA of the set of resource usage samples comprises applying a weighting algorithm to the AMA.

20. The non-transitory computer readable medium of claim 15, wherein executing the recovery procedure comprises halting a process responsible for a reduction in the availability of the resource.

* * * * *

UNITED STATES PATENT AND TRADEMARK OFFICE
CERTIFICATE OF CORRECTION

PATENT NO. : 9,104,612 B2  
APPLICATION NO. : 14/010893  
DATED : August 11, 2015  
INVENTOR(S) : Hsieh et al.

Page 1 of 1

It is certified that error appears in the above-identified patent and that said Letters Patent is hereby corrected as shown below:

In the specification,
In column 3, line 36, delete "200 s" and insert -- 200s --, therefor.

Signed and Sealed this
Fifteenth Day of March, 2016

Michelle K. Lee
*Director of the United States Patent and Trademark Office*